United States Patent Office 3,773,825
Patented Nov. 20, 1973

3,773,825
FIRE RETARDANT POLYESTER PLASTICIZERS
Charles E. Reineke, Midland, Mich., assignor to The Dow Chemical Company, Midland, Mich.
No Drawing. Filed Dec. 10, 1971, Ser. No. 206,938
Int. Cl. C07c 69/44
U.S. Cl. 260—485 G      2 Claims

ABSTRACT OF THE DISCLOSURE

New low molecular weight, saturated polyesters of the formula (A)
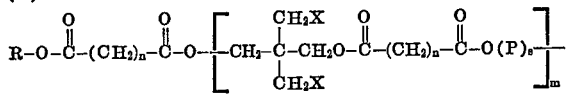

wherein
P is

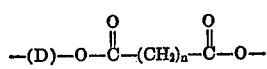

R is a saturated alkyl radical of up to about 10 carbon atoms, and
$s$ is 0 to 5;
or
(B)
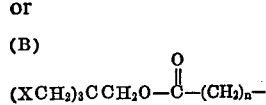

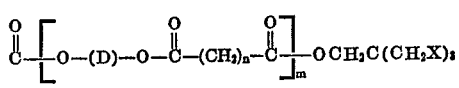

wherein, in both (A) and (B),
X is independently Br or Cl,
D is the residue of a diol selected from the group consisting of ethylene glycol, diethylene glycol, triethylene glycol, trimethylene glycol, propylene glycol, butylene glycol, and 2,2-dimethyl-1,3-propanediol formed by removal of the hydroxyl groups,
$m$ is 1 to 4, and
$n$ is 4 to 8.

These polyesters are useful as fire retardant plasticizers for vinyl chloride polymers, either alone or in combination with nonhalogenated containing plasticizers.

BACKGROUND OF THE INVENTION

Most commercial polymeric plasticizers are linear saturated polyesters. The dibasic acids which are available and are used in commercial products are adipic, azelaic and sebacic. Similar acids such as glutaric are also suitable. Ring structure acids such as the three isomers of phthalic acid are sometimes used in mixture with the linear acids, primarily to reduce cost. The dibasic acids are reacted with a variety of diols such as propane diol-1,2, butane diol-1,3, and 2,2-dimethyl-1,3-propane diol.

The literature contains many references, frequently in the form of patents, to possible structures for polyester plasticizers. See for example, Whittington, L. R. (ed.), "A Guide to the Literature and the Patents Concerning Polyvinyl Chloride Technology," 2d ed., Society of Plastics Engineers, Inc., Stamford, Conn., 1963, pp. 47–98; Penn, W. S., "PVC Technology," MacLaren, London, 1962, pp. 55, 85, 110–120, 370; Mellan, I., "Industrial Plasticizers," MacMillan, New York, 1963, pp. 243–255.

Many vinyl chloride polymers are classified as nonburning because of their high chlorine content. Of these, polyvinyl chloride (PVC) is the most widely used. The major use of PVC, however, is in plasticized compositions where the plasticizer is used in amounts ranging up to greater than 100 parts of plasticizer per 100 parts of PVC. An important aspect of performance is the physical properties of the plasticized vinyl composition. These properties include compatibility, volatility, tensile strength, elongation, modulus at 100% elongation and hardness, among others, such as low migration and low extractability.

In most cases, the plasticizer is flammable and when compounded with PVC in amounts greater than 30–40 parts per 100 of PVC (phr.), the final composition may become flammable. Thus, fire retardant compositions can be obtained by the addition of antimony oxide to dioctyl phthalate plasticized PVC, but this has the disadvantage of producing nontransparent product. Phosphate esters also can be used as fire retardant plasticizers, but problems of volatility and permanence are presented. Chlorinated paraffins are sometimes used as extender plasticizers for the fire retardant effects, but have limited compatibility with PVC.

SUMMARY OF THE INVENTION

New compounds have now been found according to the present invention comprising low molecular weight saturated polyester of the formula (A)
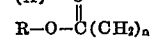

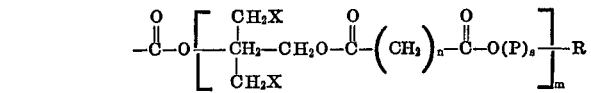

wherein
P is

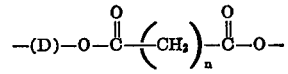

R is a saturated alkyl radical of up to about 10 carbon atoms, and
$s$ is 0 to 5;
or
(B)
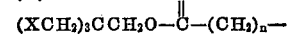

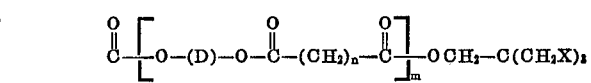

wherein, in both (A) and (B),
X is independently Br or Cl,
D is the residue of a diol selected from the group consisting of ethylene glycol, diethylene glycol, triethylene glycol, trimethylene glycol, propylene glycol, butylene glycol, and 2,2-dimethyl-1,3-propanediol formed by removal of the hydroxyl groups,
$m$ is 1 to 4, and
$n$ is 4 to 8.

It has also been found according to the present invention that the above esters are excellent fire retardant plasticizers for vinyl chloride polymers, either alone or in combination with nonhalogen containing plasticizers, such as phthalates, phosphates, epoxy plasticizers, esters of aliphatic diacids, polyesters, and the like. These novel compounds, physically incorporated into the vinyl chloride polymers, are compatible with the polymer, and the many important applications of the plasticized vinyl chloride polymers that have been made possible by the use of polymeric plasticizers are retained and additionally the polymer is rendered fire retardant.

The significant novel features of the present invention are the new low molecular weight saturated polyesters which are highly desirable as fire retardant plasticizers and the vinyl chloride polymers containing a compound of the invention as a fire retardant plasticizer, used alone or in combination with other plasticizers.

The preferred compounds of the invention are those where each X is Br.

Of special interest are those low molecular weight saturated polyesters of the present invention which are made with adipic and azelaic acids because of their demonstrated effectiveness.

The fire retardant plasticizers of the invention are prepared by known esterification reactions in which the appropriate dibasic acid is reacted with the desired halogenated alcohol or glycol and the nonhalogenated alcohol and/or glycol. Representative examples of suitable dibasic acids for the reaction are the saturated dicarboxylic acids, including the anhydrides, such as oxalic, malonic, succinic, glutaric, adipic, pimelic, subaric, azelaic, and sebacic acid. Any of these acids may contain at the time of the esterification reaction inert substituents which do not materially derogate from the effectiveness of the final additive. The nature, number and positioning of these inert substituents is not critical. Suitable substituents include halogen, lower alkyl, nitro, cyano and sulfo.

Employing known esterification techniques any of the compounds of the general formulas of the invention can be prepared by proper selection of the starting materials.

The second major aspect of the present invention is the incorporation of the fire retardant plasticizers of the invention into certain vinyl chloride polymers to give a fire retardant product having desirable physical and chemical properties. As noted above, this new fire retardant plasticizer can be added to the polymer either alone or in combination with nonhalogen containing plasticizers. The additive of the invention will be more effective with some combinations than it is with others, but the desired effect can be obtained by proper adjustment of the fire retardant concentration in the polymer.

Suitable vinyl chloride polymers are herein defined to include homopolymers and copolymers in which vinyl chloride is the major constituent wherein such copolymers contain at least 50 weight percent of vinyl chloride. The preferred vinyl chloride polymers are those which contain 70 weight percent or more vinyl chloride. Especially preferred is polyvinyl chloride (PVC) because of its demonstrated effectiveness in the invention.

The fire retardant plasticizer is physically incorporated into the vinyl chloride polymer by mixing or dissolving, along with any other desired plasticizer. The polymer is then processed in its normal manner to give the desired end-product.

The amount of the fire retardant plasticizer incorporated in the composition varies widely and is dependent upon the fire retardancy wanted, and the desired physical properties of the plasticized vinyl composition. Generally, however, when the halogenated, saturated polyester of the present invention is used alone with the vinyl chloride polymer, i.e., in the absence of other plasticizers, a desirable composition has about 30 to about 100 parts by weight of the polyester, with amounts of about 40 to about 80 parts by weight being preferred. When a nonhalogenated plasticizer is introduced into the vinyl chloride polymer along with the polyester of the present invention, a desirable composition has about 20 to about 70 parts by weight of the nonhalogenated plasticizer and 10 to about 70 parts by weight of the polyester of the present invention, with the combined parts by weight of the two plasticizers comprising less than about 120 parts by weight, all parts by weight based on 100 parts by weight of the vinyl chloride polymer.

Of course, as the amount of the fire retardant plasticizer in the composition is increased, the properties of the resultant product are altered. By the use of the polyesters of the invention, however, desirable fire retardant plasticized compositions can be prepared without materially affecting the other desirable properties of the polymer. Also, the fire retardancy per part by weight of the polyester of the present invention will depend on the particular polyester of the invention employed.

It is to be understood that the particular polyesters of the invention can be used singly or in combination with each other.

The nonhalogenated plasticizers, if used, can be any of the many polymeric plasticizers available which are formed by reacting alcohols or glycols with saturated dicarboxylic acids, or simple esters such as di-2-ethylhexyl phthalate (DOP). As indicated, most commercial polymeric plasticizers are linear saturated polyesters using dibasic acids such as adipic, azelaic, sebacic, and the like. However, ring structure acids such as the three isomers of phthalic acid can also be used in mixture with the linear acids. The dibasic acids can be reacted with a variety of diols and the average molecular weights of such plasticizers can range from 700 to over 10,000. Some of the very high molecular weight polyesters are hydroxyl terminated. However, most polyesters are terminated with long chain monobasic acids or monohydric alcohols. A typical commercial product might be an $n=12$ polyester made from propylene glycol (propanediol-1,2) and adipic acid with lauric acid as the terminator. The $n$ number, herein, refers to the number of repeating units, in this case monoesters of propylene glycol and adipic acid, in the polyester molecule. Where hydroxyl termination is employed, the structure may be represented as follows where A is a dibasic acid and G a diol:

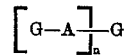

Similarly, a polyester terminated with a monobasic acid (L) may be represented as:

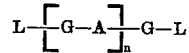

and one terminated with a monohydric alcohol (H) as:

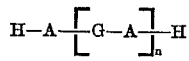

Such plasticizers can include the esters and polyesters of di-n-hexyl azelate, diethylene glycol dipelargonate, diisooctyl azelate, di-2-ethylhexyl azelate, tetrahydrofurfuryl oleate, triethylene glycol dipelargonate and the like. Many such plasticizers are mixtures of various such esters and polyesters.

SPECIFIC EMBODIMENTS

Example 1

A resin kettle, fitted with a mechanical stirrer, a nitrogen sparge tube, a Dean-Stark trap, and a condenser, was charged with azelaic acid (376 g., 2 moles), 2,2-bis-(bromomethyl)propan-1,3-diol (262 g., 1 mole), 2-ethylhexanol (286 g., 2.2 moles), para-toluenesulfonic acid monohydrate, 6.7 g. and toluene (100 ml.). The reactants and solvent were then heated to 125° C. and stirred under nitrogen at that temperature for 2 hours. The temperature was then increased to 145° C. and reaction continued until water ceased to form (ca. 8 hours). The acid number was 4.3. The acid catalyst was neutralized with anhydrous potassium carbonate and excess 2-ethylhexanol removed by steam distillation.

The insoluble salts were partially removed by filtration of the hot product through glass wool. The final ester product had a viscosity of 160 centipoises, a Gardner color of 4, and average molecular weight of 640, and contained 18.4±.2 percent bromine.

Example 2

According to the procedure of Example 1, adipic acid (146 g., 1 mole), 2,2-bis(bromomethyl)-1,3-propanediol (131 g., 0.5 mole), 2-ethylhexanol (143 g., 1.1 mole) and p-toluenesulfonic acid monohydrate (2 g., 0.01 mole) were reacted for 1.5 hours at 130° C. and then at 150° C. until water formation ceased. The acid number was 7.6. The acid catalyst was neutralized with 2 g. of calcium carbonate and filtered through glass wool to remove the insoluble salts. The ester product was a liquid having a viscosity of 145 centipoises, a Gardner color of 2, an average molecular weight of 570, and contained 20.6±0.2 percent bromine.

Example 3

Azelaic acid (188 g., 1.0 mole), 2,2-bis(bromomethyl)-1,3-propanediol (173 g., 0.66 mole), 2-ethylhexanol (102 g., 0.78 mole) and p-toluenesulfonic acid monohydrate (2.8 g., 0.02 mole) were reacted by the procedure in Example 1. The acid number at the end of the reaction was 10. The acid catalyst was neutralized with calcium carbonate and filtered to give a polyester product having a viscosity of 750 centipoises, a Gardner color of 7, an average molecular weight of 770, and a bromine content of 24.1±0.2 percent.

Example 4

Adipic acid (146 g., 1 mole), diethylene glycol (53 g., 0.5 mole), 3 - bromo-2,2-bis(bromomethyl)-1-propanol (325 g., 1 mole), p-toluenesulfonic acid monohydrate, 2 g. and 150 ml. of toluene were refluxed at 130° C. for 2 hours, and then at 160° C. until water ceased to form. The acid number at that time was 7.9. Calcium carbonate, 1 g. was added to neutralize the acid catalyst and the insoluble solids were removed by filtration. The polyester product showed a viscosity of 5500 centipoises at 25° C. and a Gardner color of 7. The average molecular weight of the product was 740 and the bromine content was 46.9±0.5 percent.

Example 5

According to procedures of the earlier examples, adipic acid (386 g., 2.64 moles), 2,2-bis(bromomethyl)-1,3-propanediol (259 g., 0.99 mole), 2,2-dimethyl-1,3-propanediol (103 g., 0.99 mole), 2-ethylhexanol (171.6 g., 1.32 moles) and 2 g. of p-toluenesulfonic acid were reacted under a nitrogen atmosphere at 130° C. for 6 hours. Reaction was then continued at 150° C. for an additional 5 hours, at which time, water ceased to form and the acid number was 9. The catalyst was neutralized with calcium carbonate and the product was then steam distilled and filtered. The polyester had a Gardner color of 6, a viscosity of 2200 cps., an average molecular weight of 960 and contained 19.1% bromine.

Example 6

The ester products from Examples 1–5 were incorporated into polyvinyl chloride (Dow PVC 2103) having a solution viscosity of 1.90–2.05 cps. measured in 2 percent-o-dichlorobenzene and an inherent viscosity of 0.95–1.0. Samples were compounded in a Brabender mixer at a temperature of 150–160° C. for 3–4 minutes. All samples were stabilized with 3 phr. of a barium cadmium thermal stabilizer. Test samples were molded in a compression press at 170–180° C. under 800–900 p.s.i. pressure, and then stamped or cut from the compressed sheet.

In order to provide suitable comparisons of the polyesters of the present invention with nonhalogenated polyester plasticizers, flammability tests of several nonhalogenated polyester plasticizers were made using the limited oxygen index test as outlined in ASTM D2863. This test is described in T. L. Isaacs, "J. Fire and Flammability," 1, p. 36 (1970).

The first of these is shown in Table 1, below, using DOP.

TABLE 1

| Parts by weight | | ASTM-D2863, LOI |
|---|---|---|
| PVC [a] | DOP | |
| 100 | 0 | 0.420 |
| 100 | 30 | 0.260 |
| 100 | 40 | 0.240 |
| 100 | 50 | 0.230 |
| 100 | 60 | 0.226 |

[a] Contains no thermal stabilizer.

The flammability of PVC plasticized with two commercially available plasticizers, Plastolein® 9722 and Plastolein® 9789 was also determined by the same test. Plastolein® is the trademark for vinyl plastiscizers, including polyester and esters such as di-n-hexyl azelate, diethylene glycol dipelargonate, diisooctyl azelate, di-2-ethylhexyl azelate, tetrahydrofurfuryl oleate, triethylene glycol dipelargonate, and mixtures of these and the like. The flammability results are given in Table 2, below.

TABLE 2

| Parts by weight | | | ASTM-D2863 LOI |
|---|---|---|---|
| PVC [a] | Plastolein® 9722 | Plastolein® 9789 | |
| 100 | 60 | 0 | 0.241 |
| 100 | 80 | 0 | 0.227 |
| 100 | 90 | 0 | 0.215 |
| 100 | 0 | 60 | 0.255 |
| 100 | 0 | 80 | 0.233 |
| 100 | 0 | 90 | 0.221 |

[a] All samples contained 3 phr. thermal stabilizer.

The physical properties of the polyesters of the present invention from Examples 1–4, above, were compared to those of two nonhalogen containing polyesters in Table 3. Plastolein® 9722 and Plastolein® 9750 were used for comparison having an average molecular weight of 1000 and 2200, respectively. ASTM Method D412 (20 inches/minute grip separation) was used.

TABLE 3.—PHYSICAL PROPERTIES

| Plasticizer | Phr. | Tensile strength | Elongation | Modulus at 100% elongation | Shore A, hardness |
|---|---|---|---|---|---|
| Example: | | | | | |
| 1, product | 62.5 | 2,389 | 724 | 860 | 80 |
| 2, product | 62.5 | 2,135 | 610 | 722 | 79 |
| 3, product | 62.5 | 2,386 | 436 | 1,227 | 84 |
| 4, product | 62.5 | 3,085 | 334 | 2,767 | >100 |
| 5, product | 60.0 | 2,787 | 532 | 1,667 | 88 |
| Plastolein®: | | | | | |
| 9722 | 62.5 | 2,162 | 482 | 1,070 | 81 |
| 9750 | 62.5 | 2,513 | 530 | 1,148 | 85 |

In addition, a comparison of the volatility from PVC of the plasticizers of the present invention and Plastolein® 9722 was made using ASTM D1203–67 (70° C. for 24 hours, 75 mil. samples).

TABLE 4.—VOLATILITY OF PLASTICIZERS FROM PVC

| Plasticizer | Phr. | Percent loss |
|---|---|---|
| Example: | | |
| 1, product | 62.5 | 0.374 |
| 2, product | 62.5 | 1.22 |
| 3, product | 62.5 | 0.596 |
| 4, product | 62.5 | 0.402 |
| Plastolein® 9722 | 62.5 | 0.306 |

The flammability characteristics of PVC samples plasticized with plasticizers from Examples 1–4, were determined by the limiting oxygen index method (ASTM D2863).

TABLE 5.—FLAMMABILITY OF PVC PLASTICIZED ONLY WITH PRODUCTS OF THIS INVENTION

| | Percent Br | ASTM D2863, LOI |
|---|---|---|
| Example: | | |
| 1, product [a] | 6.87 | 0.259±.002 |
| 2, product | 7.78 | 0.276±.003 |
| 3, product | 9.10 | 0.305±.001 |
| 4, product | 17.7 | >.40 |

[a] All samples were incorporated at 62.5 phr. plasticizer with 3 phr. thermal stabilizer.

The flammability characteristics of PVC samples plasticized with Example 3 product of the present invention and DOP were determined by the LOI method of ASTM D2863.

TABLE 6.—FLAMMABILITY OF PVC PLASTICIZED WITH EXAMPLE 3 PRODUCT AND DIOCTYLPHTHALATE (DOP)

| Parts by weight | | | | |
|---|---|---|---|---|
| PVC | DOP | Example 3, product | Percent Br [a] | ASTM D2863, LOI |
| 100 | 60 | 0 | 0 | 0.236 |
| 100 | 40 | 20 | 2.96 | 0.260 |
| 100 | 30 | 30 | 4.44 | 0.274 |
| 100 | 20 | 40 | 5.91 | 0.284 |
| 100 | 0 | 60 | 8.87 | 0.305 |

[a] Percent bromine in total composition.

The flammability characteristics of PVC plasticized with Example 4 Product of the present invention and nonhalogenated commercial plasticizers was determined as shown in Table 7, below.

TABLE 7.—FLAMMABILITY OF PVC PLASTICIZED WITH EXAMPLE 4 PRODUCT AND NONBROMINE CONTAINING PLASTICIZERS

| Parts by weight [a] | | | | | |
|---|---|---|---|---|---|
| PVC | Plastolein® 9722 | Plastolein® 9789 | Example 4, product | Percent Br | LOI |
| 100 | 20 | | 40 | 11.50 | 0.335 |
| 100 | 30 | | 30 | 8.63 | 0.320 |
| 100 | 40 | | 20 | 5.75 | 0.296 |
| 100 | | 20 | 40 | 11.50 | 0.357 |
| 100 | | 30 | 30 | 8.63 | 0.332 |
| 100 | | 40 | 20 | 5.75 | 0.303 |

[a] Total of 60 phr. plasticizer mixture.

The flammability characteristics of PVC plasticized with Example 5 product alone and in mixture with DOP and a nonhalogenated polyester plasticizer was determined as shown in Table 8, below.

From a comparison of Tables 1 and 2 with Tables 5, 6, 7 and 8, it is seen that the flammability of PVC plasticized with the products of this invention either alone or in combination with the nonhalogenated containing plasticizers was surprisingly effectively decreased over those using the nonhalogenated plasticizers alone. Moreover, TABLE 8.—FLAMMABILITY OF PVC PLASTICIZED WITH EXAMPLE 5 PRODUCT AND MIXTURES WITH DOP AND NONBROMINE CONTAINING PLASTICIZERS

| Parts by weight | | | | | |
|---|---|---|---|---|---|
| PVC [a] | Example 5, product | DOP | Plastolein® 9722 | Percent Br [b] | LOI |
| 100 | 50 | | | 6.24 | .296 |
| 100 | 60 | | | 7.03 | .294 |
| 100 | 70 | | | 7.73 | .288 |
| 100 | 40 | 20 | | 4.68 | .283 |
| 100 | 20 | 40 | | 2.34 | .266 |
| 100 | 0 | 60 | | 0 | .246 |
| 100 | 40 | | 20 | 4.68 | .273 |
| 100 | 20 | | 40 | 2.34 | .257 |
| 100 | 0 | | 60 | 0 | .236 |

[a] All compositions contained 3 phr. Ferro 1825 Ba-Cd soap thermal stabilizer.
[b] Percent bromine in total composition.

Tables 3 and 4 show that the physical properties of the polymer were not deleteriously affected by the presence of the products of the present invention.

In the same manner as described above, when chlorine is substituted for bromine, either in whole or in part, in the low molecular weight saturated polyesters of the present invention, suitable fire retardant plasticizers are obtained.

It is to be understood that other additives in minor amounts, such as thermal stabilizers, terminators, and the like, may be employed without departing from the scope of the present invention. Likewise, the enhancement of the fire retardancy of the polyesters of the present invention by the addition of other known fire retardants such as antimony oxide, phosphate compounds, other halogen-containing materials, and the like, is contemplated herein.

I claim:

1. A low molecular weight saturated polyester of the formula $$(BrCH_2)_3CCH_2O-\overset{O}{\underset{\|}{C}}-(CH_2)_4-\overset{O}{\underset{\|}{C}}-O-(D)-O-\overset{O}{\underset{\|}{C}}-(CH_2)_4-\overset{O}{\underset{\|}{C}}-OCH_2C(CH_2Br)_3$$

wherein

D is the residue of a diol selected from the group consisting of ethylene glycol, diethylene glycol, triethylene glycol, trimethylene glycol, propylene glycol, butylene glycol, and 2,2-dimethyl-1,3-propanediol, formed by removal of the hydroxyl groups.

2. The polyester of claim 1 wherein D is the residue of diethylene glycol, formed by removal of the hydroxyl groups.

References Cited

UNITED STATES PATENTS

| 3,700,957 | 10/1972 | Daniels | 260—485 G |
| 3,194,791 | 7/1965 | Wilson et al. | 260—485 G |
| 3,048,608 | 8/1962 | Girard | 260—485 G |

LORRAINE A. WEINBERGER, Primary Examiner

E. J. SKELLY, Assistant Examiner

U.S. Cl. X.R.

260—31.6